Oct. 30, 1951     L. S. McINTOSH     2,573,477
OIL PRESSURE REGULATOR
Filed Sept. 13, 1945

Inventor
Leonard S. McIntosh,

By Clarence A. O'Brien
and Harvey B. Jacobson
Attorneys

Patented Oct. 30, 1951

2,573,477

UNITED STATES PATENT OFFICE 2,573,477

OIL PRESSURE REGULATOR

Leonard S. McIntosh, San Antonio, Tex., assignor of one-half to Nathan Nevelow, San Antonio, Tex.

Application September 13, 1945, Serial No. 616,010

3 Claims. (Cl. 184—6)

This invention relates to a device for remotely controlling the pressure of oil in the lubricating system of an internal combustion engine, in accordance with the temperature and viscosity of the oil, so as to insure proper lubrication of the bearings and other engine parts when the oil is thinned by heat.

More particularly, this invention contemplates the provision of a device controllable from the driver's seat of a motor driven vehicle for varying the strength of the valve seating spring of a pressure relief valve used in the lubricating system of an internal combustion engine, whereby to increase the oil pressure in the system and thereby insure proper lubrication of the bearings and other engine parts when the oil is thinned by heat, and to reduce the pressure when the oil cools and thickens.

Heretofore, it has been the practice to use a pressure relief valve in the lubricating system of an internal combustion engine in order to maintain the oil in the system under a predetermined pressure when operating conditions are normal. In order to take care of abnormal conditions, such as when the oil is thinned by heat so as to reduce the pressure in the system, means has been provided which is manually adjustable at the pressure relief valve for increasing the strength of the valve seating spring of said pressure relief valve. This is objectionable for the reason that the pressure relief valve is not readily accessible, and adjustment of its spring necessitates stopping of and dismounting from the vehicle.

The important advantage, therefore, of the present invention, is that it provides regulating means which is operable from a point remote to the pressure relief valve or from the driver's seat of the motor driven vehicle.

An important object of the present invention is to provide an oil pressure regulating device of the above kind which is simple in construction, easy to install and use, and efficient in use.

The exact nature of the present invention, as well as specific objects and features thereof, will become apparent from the following description when considered in connection with the accompanying drawing, in which.

Figure 1:
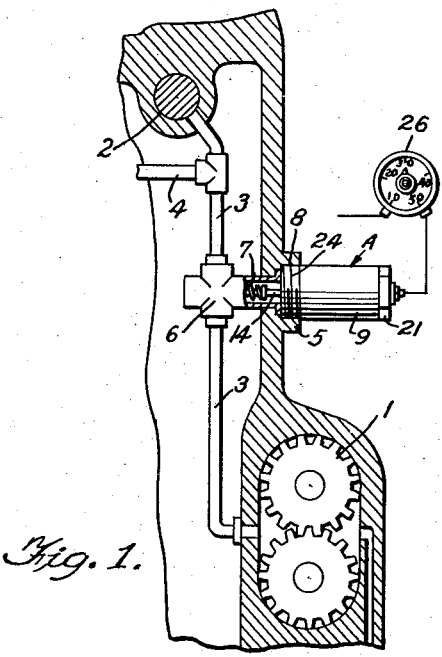
Figure 1 is a fragmentary view, partly diagrammatic, illustrating an oil pressure regulator installed in operative relation to the pressure relief valve of an engine lubricating system, certain parts being shown in side elevation and others being shown partly broken away and in section.
Figure 2:
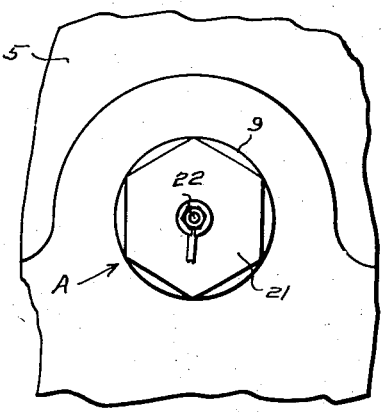
Figure 2 is a view looking toward the left of Figure 1 with parts omitted.
Figure 3:
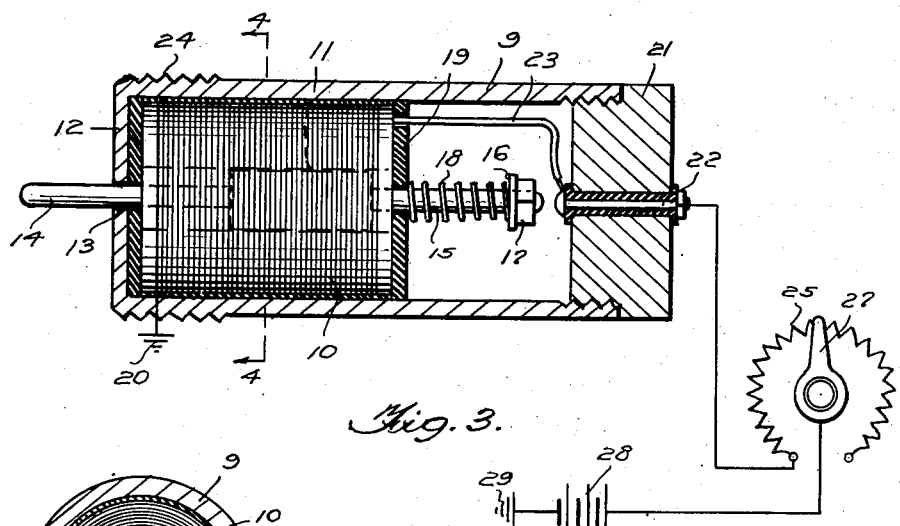
Figure 3 is a sectional view of the regulator detached from the engine and on an enlarged scale, and illustrating schematically the electrical connection to the solenoid coil from a storage battery through a rheostat.
Figure 4:
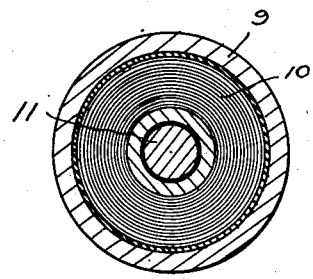
Figure 4 is a transverse section taken on the plane of line 4—4 of Figure 3.

Referring in detail to the drawings, 5 indicates a portion of the cylinder block of an internal combustion engine which is provided with an oil channel forming part of the lubricating system of the engine. Part of the usual pressure relief valve is indicated at 6 and its valve seating spring at 7. The relief valve 6 operates to permit by-passing of the oil back to the reservoir when the oil pressure becomes sufficient to unseat the valve against the action of the spring 7. Lubricating oil flows from the gear pump 1 to the bearings of the internal combustion engine, one such bearing being illustrated at 2. The oil from the pump flows through pipe line 3 and branch line 4 to the bearings. Ordinarily, a plug is threaded into the block 5 at the point 8, and a spring is interposed between this plug and the spring 7 so that inward adjustment of the plug will effect the desired regulation of the strength of spring 7. This plug is relatively inexcessible and must be manually adjusted at the point where it is threaded into the block. In order to install the present invention, the ordinary adjustable plug and the spring interposed between it and the valve seating spring 7 is removed, and the spring strength adjusting unit A of my invention is threaded into the block at 8 in place of the removed plug.

As shown, the unit A consists of a casing 9 mounted in and insulated from one end of which is the coil 10 of a solenoid having a core 11. The casing 9 has an end wall 12 adjacent the inner end of the coil 10 which is provided with a central aperture 13 through which slidably projects the reduced end portion 14 of the core 11. The core 11 also has a reduced outer end 15 on the free end of which is secured a washer 16 by means of a nut 17. The reduced end 15 is encircled by a compression spring 18 interposed between the washer 16 and the guide disc 19 positioned in the casing 9 at the outer end of coil 10. Spring 18 thus acts to normally shift the core 11 to an outwardly retracted position, and energization of the coil 10 effects inward movement of the core 11 and projection of its inner end 14. The winding of coil 10 is grounded at one end as at 20. The outer end of casing 9 is provided with a removable closure plug 21 having a central binding post 22 to which the other end of the winding of coil 10 is connected by means of a wire 23. The inner end of casing 9 is externally threaded at 24 so that it may be threaded into the engine block 5 as at 8 with the inner end 14 of the core 11 disposed to engage the outer end of the spring 7 of the pressure relief valve. By regulating the amount of current passing through the coil 10, the adjustment of core 11 against the action of spring 18 may be varied so as to vary the compression of spring 7 of the pressure relief valve as desired and found proper under differing operating conditions of the engine. In other words, as the pressure in the lubricating system lowers due to heating and thinning of the oil as shown by the pressure gauge ordinarily employed in the lubricating system, the spring 7 may be compressed to increase the strength thereof to the desired degree, according to the adjustment of the core 11 of the solenoid.

In order to regulate the amount of current passing through the coil 10, the binding post 22 is connected to one terminal of the resistance 25 of an adjustable rheostat 26. This rheostat includes a movable contact 27 coacting with the resistance 25 to limit the current flowing to the binding post 22 from the battery 28. Battery 28 has its positive terminal connected to the contact 27, while its negative terminal is grounded at 29.

In operation, the rheostat 26 is operated so as to cause current of predetermined amperage to pass through the coil 10 and thereby effect a predetermined inward adjustment of the core 11 for effecting a predetermined increase in the strength of the valve seating spring 7 of the pressure relief valve so as to thereby increase the oil pressure in the lubricating system of the engine and insure proper lubrication of the bearings and other engine parts when the oil is thinned by heat. Conversely, as the oil in the lubricating system cools and thickens, the core 11 may be adjusted outwardly by reducing the amount of the current passing through the coil 10 through the medium of the rheostat, to thereby decrease the compression of the valve seating spring 7 and correspondingly decreasing the back pressure in the lubricating system. It is obvious that the rheostat 26 may be readily installed at a point remote from the unit A, such as on the instrument panel of a motor vehicle, thereby rendering the same accessible from the driver's seat of the vehicle. In this way, it will be unnecessary to stop the vehicle and dismount therefrom and then obtain access to the pressure relief valve under difficulties for adjusting its valve seating spring.

From the foregoing description, it is believed that the construction, operation and advantages of the present invention will be readily understood and appreciated by those skilled in the art. Minor changes may be made in details of construction illustrated and described, such as fall within the scope of the invention as claimed.

What I claim is:

1. In a lubricating system of an internal combustion engine which includes a spring actuated oil pressure relief valve the improvement comprising mechanism associated with said pressure relief valve for varying the strength of said spring whereby the relief valve will operate in response to a different pressure in the lubricating system, said mechanism comprising a solenoid coil and core, said core having a projection on its inner end which cooperates with said spring to vary the force exerted by said spring on said relief valve, and a rheostat electrically connected to said solenoid coil for varying the current passing through said coil to adjustably position said core relative to said spring, said rheostat being located remotely from said solenoid coil and core.

2. In a lubricating system of an internal combustion engine which includes an oil pressure actuated relief valve having a spring for seating said valve, means for adjusting the pressure of the seating spring for said relief valve comprising a solenoid coil, a spring retracted and electromagnetically projected core arranged in said coil, means carried by said core for acting upon said relief valve spring for compressing the same when said core is projected, and variable electrical resistance means connected to said solenoid core and positioned remotely therefrom for varying the amount of current passing through said coil to adjustably position said core relative to said coil and thereby correspondingly adjust the pressure exerted by said relief valve spring.

3. In the lubricating system of an internal combustion engine of a motor vehicle, wherein the engine cylinder block is provided with an oil channel forming part of the engine lubricating system and having a spring-seated pressure relief valve therein, and with an opening into which a plug is ordinarily adjustably threaded for use in adjusting the strength of the seating spring of said relief valve, an electrical solenoid operated core manually controllable at a remote position from said relief valve for adjusting the strength of said relief valve seating spring, said electrical solenoid core operated means embodying a casing threaded into said opening in place of said plug and a spring retracted actuating element carried by said core and engaging the outer end of said seating spring of the relief valve and a rheostat control means for said solenoid which is connected thereto and operable remotely therefrom.

LEONARD S. McINTOSH.

REFERENCES CITED

The following references are of record in the file of this patent:

UNITED STATES PATENTS

| Number | Name | Date |
| --- | --- | --- |
| 678,095 | Brown | July 9, 1901 |
| 1,208,286 | Campbell | Dec. 12, 1916 |
| 1,256,754 | White | Feb. 19, 1918 |
| 1,271,108 | White | July 2, 1918 |
| 1,339,530 | Vincent | May 11, 1920 |
| 1,367,452 | Bolton | Feb. 1, 1921 |
| 1,892,917 | Walker | Jan. 3, 1933 |
| 2,013,222 | Thomas | Sept. 3, 1935 |
| 2,310,745 | Parks | Feb. 9, 1943 |
| 2,436,102 | Douglas | Feb. 17, 1948 |
| 2,436,224 | Ogle | Feb. 17, 1948 |
| 2,440,883 | Wiegman | May 4, 1948 |